(12) United States Patent
Frank et al.

(10) Patent No.: US 7,528,510 B2
(45) Date of Patent: May 5, 2009

(54) SUPERCONDUCTING MACHINE DEVICE WITH A SUPERCONDUCTING WINDING AND THERMOSIPHON COOLING

(75) Inventors: Michael Frank, Uttenreuth (DE); Adolf Kühn, Röthenbach (DE); Peter van Hasselt, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 189 days.

(21) Appl. No.: 10/556,973

(22) PCT Filed: Apr. 15, 2004

(86) PCT No.: PCT/EP2004/003987
§ 371 (c)(1),
(2), (4) Date: Nov. 3, 2006

(87) PCT Pub. No.: WO2004/102779
PCT Pub. Date: Nov. 25, 2004

(65) Prior Publication Data
US 2007/0095075 A1 May 3, 2007

(30) Foreign Application Priority Data
May 13, 2003 (DE) ................ 103 21 463

(51) Int. Cl.
*H02K 9/00* (2006.01)
(52) U.S. Cl. .................................. 310/52
(58) Field of Classification Search .......... 310/52, 310/61, 64
See application file for complete search history.

(56) References Cited

U.S. PATENT DOCUMENTS

| 5,848,532 A | 12/1998 | Gamble et al. |
| 7,049,717 B2 * | 5/2006 | Frank et al. .......... 310/61 |
| 2004/0056541 A1 * | 3/2004 | Steinmeyer ............ 310/52 |

FOREIGN PATENT DOCUMENTS

| DE | 100 39 964 A | 3/2002 |
| DE | 100 57 664 A | 5/2002 |
| WO | WO 00/13296 A1 | 3/2000 |

OTHER PUBLICATIONS

In: Proceedings of the Sixteenth International Cryogenic Engineering Conference/ International Cryogenic Materials Conference, Kitakyushu, Japan, May 20-24, 1996, Published by Elsevier Science, 1997, T. Haruyama, T. Mitsui and K. Yamafuji, pp. 1109-1129.

* cited by examiner

*Primary Examiner*—Nguyen N Hanh
(74) *Attorney, Agent, or Firm*—Henry M. Feiereisen; Ursula B. Day

(57) ABSTRACT

The machine device comprises a motor (2) with a rotor (5) rotating about an axis (A), the superconducting winding of which is coupled with thermal conduction to a central refrigerant cavity (12). The cavity (12) forms a single-tube system, together with the line sections (22) laterally connected thereto and a condenser chamber (18) of a refrigeration unit, located outside the motor (2), in which a refrigerant (k, k') circulates as result of a thermal siphon effect. According to the invention, the refrigerant supply to the central cavity (12) is maintained, even with inclined positions (d) for the rotor (5), whereby pressurization means are provided, which generate pressure pulses of gaseous refrigerant, acting on the liquid refrigerant (k) in the condenser chamber (18) or the connected line sections (22).

9 Claims, 2 Drawing Sheets

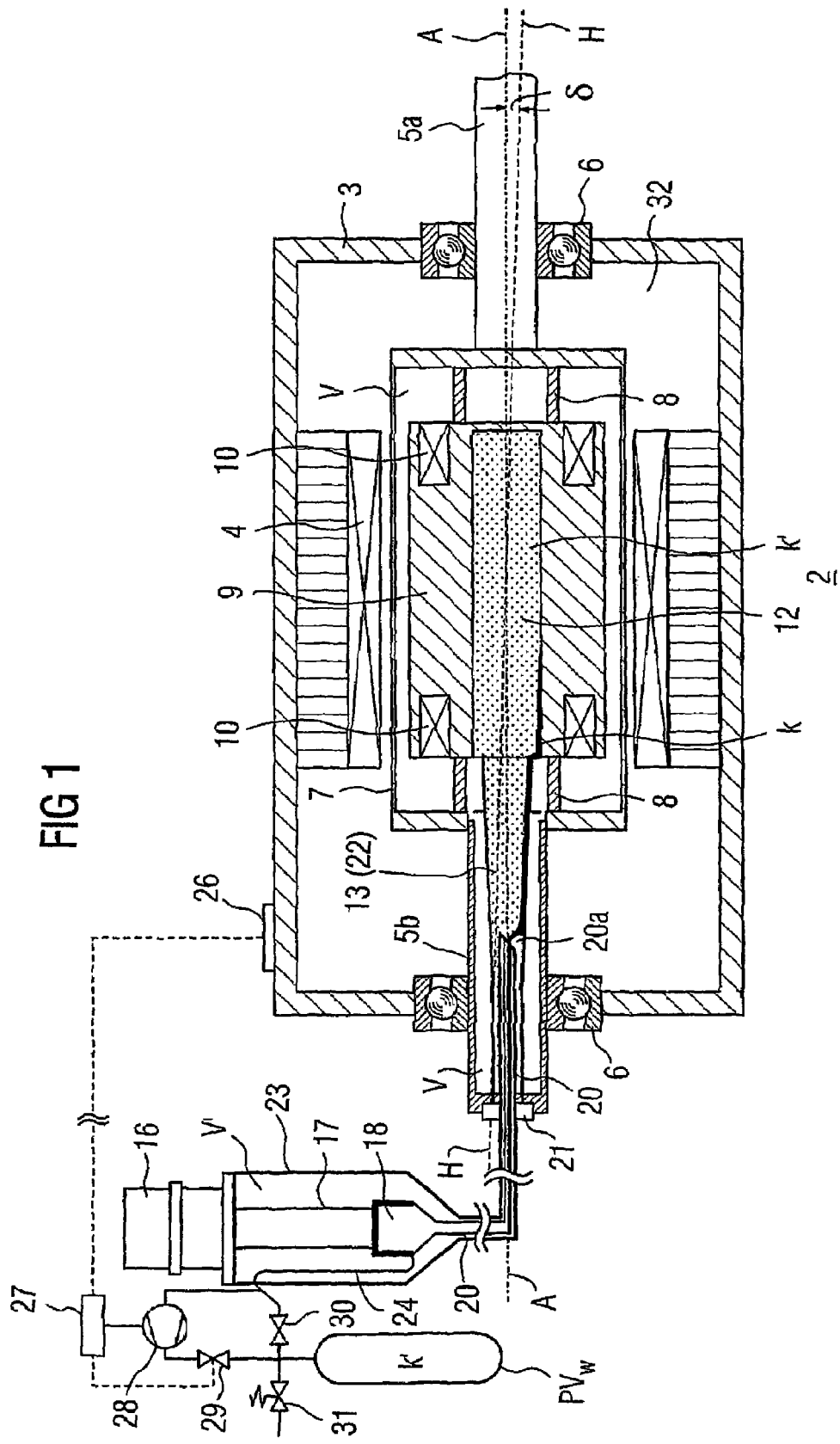

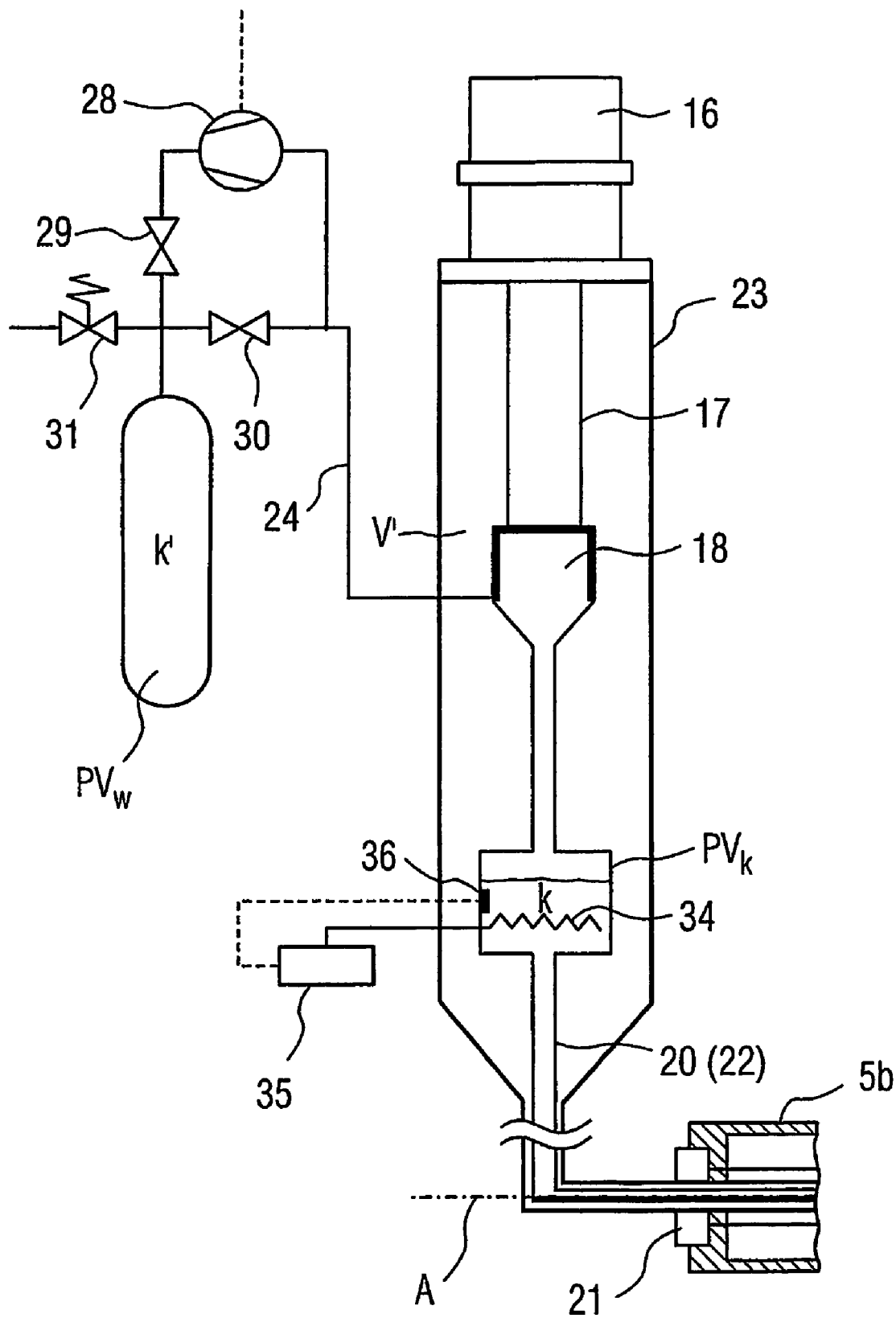

SUPERCONDUCTING MACHINE DEVICE WITH A SUPERCONDUCTING WINDING AND THERMOSIPHON COOLING

BACKGROUND OF THE INVENTION

The invention relates to a superconducting machine device with
- a rotor supported for rotation about a rotation axis, the rotor having at least one superconducting winding with a conductor that is coupled for heat transmission to a central cylindrical cavity extending in the axial direction,
- a stationary cooling unit located outside the rotor having a condenser space, and
- tubular line sections extending between the center cavity of the rotor and the condenser space of the cooling unit.

The cavity, the tubular line sections and the condenser space form a closed single-tube line system with a coolant disposed therein, wherein by way of a thermosiphon effect, coolant condensing in the condenser space reaches the central cavity through the tubular line sections and coolant evaporating in the cavity is returned to the condenser space via the line sections. A machine of this type is disclosed in DE 100 57 664 A1.

Metal oxide superconducting materials with superconducting transition temperatures $T_c$ above 77 K are known since 1987. These materials are also referred to as High-$T_c$-Superconductors or HTS materials and can in principle be cooled with liquid nitrogen ($LN_2$).

Conductors using HTS materials have been employed on an experimental basis for fabricating superconducting windings for machines. Disadvantageously, however, conventional conductors of this type have a relatively small current carrying capacity when the magnetic fields reach several Tesla. In many cases, the temperature of the conductors of such windings must be maintained at temperatures below 77 K, for example between 10 and 50 K, in spite of the high superconducting transition temperatures $T_c$ of the employed materials, because these windings would otherwise not be able to carry significant currents in large magnetic fields. However, this temperature level is significantly higher than 4.2 K which corresponds to the boiling point of liquid helium (LHe), which is used to cool conventional metallic superconducting materials with relatively low superconducting transition temperatures $T_c$, so-called Low-$T_c$-Superconductors or LTS materials.

Preferably, cooling systems in the form of so-called cryo-coolers with a closed He compressed gas loop can be used for cooling windings with HTS conductors in the aforementioned temperature range below 77 K. In particular, such cryo-coolers operate according to the Gifford/McMahon or Sterling principle, or are formed as so-called pulsed tube coolers. Advantageously, they can immediately produce a cooling effect by pushing a button and avoid handling of cryogenic liquids. These cooling devices cool the superconducting winding only indirectly via thermal conduction to a cold head of a refrigerator (see, for example, "Proc. 16$^{th}$ Int. Cryog. Engng. Conf. (ICEC 16", Kitakyushu, J P, 20-24 May 1996, Published by Elsevier Science, 1997, pages 1109 through 1129).

A similar cooling technique is also used for the rotor of an electric machine, as disclosed, for example, in the aforementioned DE 100 57 664 A1. The rotor includes a rotating winding made of HTS conductors which are located in a thermally conductive winding support. The winding support includes a cylindrical central cavity extending in the axial direction, to which tubular line sections extending from the side of the winding support are connected. These line sections are routed to a raised condenser space of a cooling unit and form in conjunction with the condenser space and the central rotor cavity a closed single-tube line system. A coolant, which circulates by way of a so-called thermosiphon effect, is disposed in the line system. Coolant condensing in the condenser space flows via the tubular line sections to the central cavity, where the condensed coolant absorbs heat due through thermal coupling to the winding support and hence also to the HTS winding. The coolant then evaporates. The evaporated coolant returns via the same line sections to the condenser space where it condenses again. The required cooling power is generated by a refrigerator engine having a cold head which is thermally coupled to the condenser space.

The return flow of the coolant is driven towards the sections of the refrigerator engine operating as the condenser by a small overpressure in the central cavity, which acts as an evaporator section. The overpressure produced by the generation of gas in the evaporator section and the condensation in the condenser space thereby causes the desired return flow of the coolant. Similar coolant flow patterns are generally known in association with so-called "heat pipes."

The coolant is transported in the conventional machine with thermosiphon cooling from a corresponding cooling unit only by gravity, thereby obviating the need for additional pumping systems. A Machine device employed on ships or offshore installations may frequently experience a static tilt, also referred to as "trim", of up to ±5° and/or dynamic tilt of up to ±7.5° in the longitudinal direction. Before a series of these machines can be certified for installation on a ship, a reliable cooling performance of the cooling system of such a machine device under these conditions on board of a marine vessel must be ensured. If the machine were tilted in the aforementioned manner, a region of the tubular line sections between the central rotor cavity and the cooling units may be located at a lower level than the central rotor cavity. The coolant can then no longer reach the rotor cavity and cool the rotor cavity by gravity alone, so that there would be no guarantee that the machine could be adequately cooled and would operate reliably.

Several proposals have been made to eliminate this risk:

The simplest solution is to install the machine with a tilt relative to the horizontal so that there would still be a downward slope in the thermosiphon line system in the direction towards the rotor cavity even at the largest assumed trim position or oscillation amplitude. However, such tilted arrangement is undesirable for longer machines, in particular for shipboard installation because of the increased space requirements.

Instead of a single-tube line system, where the liquids and the gaseous coolant flow through the same tube sections, dual-tube line systems can be employed when a coolant is circulated by a thermosiphon effect (see, for example, WO 00/13296 A). However, in this case, an additional tube for the gaseous coolant must be provided in the region of the hollow rotor shaft.

In principle, the coolant could also be forced-circulated by a pumping device. However, this approach requires additional equipment, in particular when the coolant must be maintained at a temperature of, for example, 25 to 30 K. Such pumping systems also experience significant thermal losses and may be unable to satisfy the service life requirements for shipboard installations with their long maintenance intervals.

SUMMARY OF THE INVENTION

It is therefore an object of the present invention to provide a machine device which includes a machine and an associated cooling unit with the aforementioned features, so that the coolant can still reach the central rotor cavity even if the rotor is tilted, such as in an shipboard or offshore installation.

According to the invention, the machine unit should include means for increasing the pressure which produce a short-term pumping effect on the liquid coolant in the direction towards the central rotor cavity by way of pressure pulses on a gaseous coolant.

The invention is based on the idea that the coolant need not necessarily be supplied continuously to the central cavity. Based on the thermal inertia of the system, it is sufficient if the coolant is reintroduced into the rotor cavity during a short time period (="briefly") at certain time intervals. With the configuration of the machine device according to the invention it is advantageously possible adequately fill the central cavity with liquid coolant, so that the superconducting winding can be safely cooled by repeatedly applying any number of times brief pressure pulses to the liquid coolant, even if the rotor of the machine is tilted. Briefly applying the pressure (typically only for one or more seconds) prevents evaporation of large quantities of liquid coolant which would otherwise noticeably reduce the cooling efficiency on the winding.

Advantageous modifications of the machine device of claim 1 are recited in the dependent claims.

For example, the means for increasing the pressure can preferably affect the region of the condenser space or of the tubular line sections. The liquid coolant must be reliably supplied to the central rotor cavity even during a realistic tilt.

According to a preferred embodiment for achieving the short-term pumping effect, a buffer volume, which is filled with coolant under overpressure, can be connected to the condenser space or the connected line sections via a pump supplying the gaseous coolant.

Instead, a heating apparatus which operates on the liquid coolant and is activated for the short-term pumping effect during a corresponding time period may be installed on the tubular line sections. The heating apparatus can advantageously be arranged in a buffer volume which is at least partially filled with the liquid coolant. Corresponding means for increasing the pressure can be relatively easily realized.

Advantageously, a permanently pulsating pressure boost can be provided for supplying the liquid coolant to the central rotor cavity. Only relatively insignificant changes to the construction are required to implement a respective conveyance.

Instead or in addition, a pressure increase can be initiated by a sensor. For this purpose, a position sensor can be used which detects a tilt of the rotation axis relative to the horizontal, or a fill level sensor, which initiates the pressure increase, can be disposed on the tubular line sections.

BRIEF DESCRIPTION OF THE DRAWING

The invention will be described hereinafter in more detail with reference to the drawings which two preferred embodiments of a machine device.

FIG. 1 shows schematically a longitudinal section of a first embodiment of a machine of this device with an associated cooling unit, and FIG. 2 shows schematically in longitudinal cross-section another embodiment of the cooling unit for the machine.

DETAILED DESCRIPTION OF PREFERRED EMBODIMENTS

Like elements in the figures have the same reference symbols.

Machine devices according to the invention include a machine or a motor with an associated cooling unit. The embodiments of the machine described hereinafter with reference to the figures can include, in particular, a synchronous motor or a generator. The machine includes a rotating, superconducting winding which typically employs a metallic LTS material (Low-$T_c$-Superconducting material) or an oxide HTS material (High-$T_c$-Superconducting material). The following embodiments employ the latter material. The winding can be made of a coil or an assembly of coils with a two-pole, four-pole, or another multi-pole arrangement. The basic configuration of a corresponding synchronous motor is shown in FIG. 1, which is based on an embodiment of such a machine described in the aforementioned DE 100 57 664 A1.

The machine designated with reference symbol 2 includes a stationary outer housing 3 at room temperature with a stator winding 4. A rotor which is located inside the outer housing and enclosed by the stator winding 4 is supported in bearings 6 for rotation about a rotation axis A. These bearings can be conventional mechanical bearings or magnetic bearings. The rotor also includes a vacuum vessel 7, in which a winding support 9 with an HTS winding 10 is supported, for example, on hollow cylindrical, torque-transmitting suspension members 8. A central cavity 12 which extends concentrically with a rotation axis A in the axial direction is disposed in the winding support. The cavity 12 can have a cylindrical shape. The winding support is vacuum-tight with respect to the cavity and closes the cavity on the side of the rotor. The rotor is on this side supported by a solid axial rotor shaft section 5a. On the opposite side, the central cavity 12 is connected to a lateral cavity 13 having a comparatively smaller diameter. The lateral cavity extends from the region of the winding support to the exterior of the outer housing 3. The reference symbol 5b designates a tubular rotor shaft section which encloses the lateral cavity 13 and is supported in one of the bearings.

A cooling unit is provided to indirectly cool the HTS winding 10 via thermally conductive elements. Only the cold head 16 of the cooling unit is shown. The cooling unit can be a cryo-cooler of the Gifford-McMahon type, or more particularly a regenerative cryo-cooler, such as a pulse tube cooler or a Split-Sterling cooler. The cold head 16 and hence all essential additional elements of the cooling unit are located outside the rotor 5 or its outer housing 3.

The cold section of the cold head 16, which may be arranged, for example, several meters on the side of the rotor 5, is located in a vacuum vessel 23 and makes excellent thermal contact via a heat transmitting element 17 with a condensing unit for the coolant, which has a condenser space 18. A stationary vacuum-insulated heat pipe 20 is connected to the condenser space, with the heat pipe extending laterally in an axial region into the lateral, co-rotating cavity 13 or the central cavity 12. The heat pipe 20 is sealed against the lateral cavity 13 by a sealing device 21 (not shown in the Figure) having at least one sealing element which may be implemented as a ferrofluidic seal and/or as a labyrinth seal and/or as a diaphragm gland. The central cavity 12 and the heat exchanger region of the condenser space 18 are sealed gastight to the outside by the heat pipe 20 and the lateral cavity 13. The tubular sections extending between the central cavity 12 and the condenser space 18, which are adapted to receive a coolant, are generally referred to as line sections 22. These line sections together with the condenser space 18 and the central cavity 12 are referred to as a line system.

These cavities of the line system are filled with a coolant which is selected based on the desired operating temperature of the HTS winding 10. For example, hydrogen (condensation temperature 20.4 K at normal pressure), neon (condensation temperature 27.1 K at normal pressure), nitrogen (condensation temperature 77.4 K at normal pressure), or argon (condensation temperature 87.3 K at normal pressure) can be employed. Mixtures of these gases can also be used. The coolant is hereby circulated through the so-called thermosiphon effect. The coolant condenses on the cold surface of the cold head 16 in the region of the condenser space 18. The condensed coolant, indicated by k, flows through the line sections 22 to the central cavity 12. The condensed coolant is transported by gravity. The heat pipe 20 can advantageous be tilted slightly (by several degrees) relative to the rotation axis A so as to increase the outflow of the liquid coolant k from the open end 20a of tube 20. The liquid coolant then evaporates inside the rotor. The vaporized coolant is indicated by k'. The coolant, which evaporates by absorbing heat, then flows back through the inside of the line sections 22 to the condenser space 18. The return flow is supported by a slight overpressure in the cavity 12, which operates as an evaporator, in the direction to the condenser space 18, caused by the generation of gas in the evaporator and condensation in the condenser space. Because the liquefied coolant circulates from the condenser space 18 to the central cavity 12 and the evaporated coolant k' returns from the same cavity to the condenser space through the line system formed by the condenser space 18, the line sections 22 and the cavity 12, the system can be viewed as a single-tube system where the coolant k, k' circulates due to a thermosiphon effect.

As also seen in FIG. 1, a tilt can occur when the machine 2 is installed on ships or offshore installations, where the rotation axis A is tilted by an angle δ of several degrees with respect to the horizontal H. The coolant then still condenses in the condenser space 18; however, the coolant can then no longer reach the central cavity 12, so that the line sections 22, in particular in the region near the axis, increasingly fill up with liquid coolant k. The rotor cavity or the cavity 12 can become dry and would no longer be cooled, if the line system is filled only with a relatively small quantity of the coolant. When the line system is filled with a larger quantity, the accumulated liquid coolant blocks the return flow of the gaseous coolant k' in the line sections 22 to the condenser space 18 after a certain time. This may prevent the rotor or its superconducting winding from being reliably cooled. According to the invention, the gas pressure on the condenser side is briefly increased under these conditions to a level, where the liquid coolant is pushed from the line sections 22 into the central cavity 12 against gravity in the presence of a tilt angle δ).

Such increase in pressure can be implemented according to the embodiment of FIG. 1 by using a warm buffer volume $PV_w$ and a pump 28. In this way, the gas pressure in the condenser space 18 can be temporarily increased, pushing the liquid coolant k accumulated in the condenser space 18 and in the line sections 22 into the central cavity 12. A control valve 29 is then arranged in a connecting line 24 between the buffer volume $PV_w$, which is under an overpressure, and the condenser space 18. The control valve 29 opens the connection to the pump 28 which then feeds the gas k' from the buffer volume to the condenser space. A valve 30 is installed to return excess gas from the line system 20.

The pressure oscillation produced in this way can be continuous, i.e., repeating in short time intervals (each oscillation having a brief time period), or the pressure oscillation can be controlled by a control unit 27 via a position sensor 26 of conventional design. The position sensor detects the tilt, i.e., the tilt angle δ, of the machine 2 and initiates the introduction of a pressure volume (gas pulse) via the control unit 27.

For sake of clarity of the drawing, FIG. 1 does not show additional elements for supplying and venting the gas, with the exception of a fill valve for filling the system with gaseous coolant via connecting line 24, because these elements are generally known. Only the pressure relief valve 31 is shown, which is triggered by excess pressure in the system.

Of course, the elements or vessels enclosing the coolant k and k', respectively, must be insulated to prevent influx of heat. Advantageously, a vacuum provides thermal insulation, whereby additional insulation, such as super-insulation or insulating foam, can be applied in the corresponding vacuum spaces. The volume enclosed by the vacuum vessel 7 is indicated in FIG. 1 with the reference symbol V. The vacuum also surrounds the tube which surrounds the lateral cavity 13 and extends to the seal 21. The vacuum surrounding the heat pipe 20, the condenser space 18 and the heat transmitting element 17 is indicated with reference symbol V'. Optionally, a vacuum can also be provided in the interior space 32 which surrounds the rotor 5 and is enclosed by the outer housing 3.

FIG. 2 shows a detail of another cooling unit which includes means according to the invention for increasing the pressure in the machine 2 of FIG. 1. FIG. 2 only shows those elements of the cooling unit that are located outside the machine. In this embodiment, the pressure can be increased by placing a heating apparatus 34 in the lower section of the vacuum vessel 23 in a region of the connected line sections 22 or heat pipe 20 that is always filled with liquid coolant k. The heating apparatus, which is located in a cold buffer volume $PV_k$ that is generally at least partially filled with liquid coolant k, is briefly activated when the liquid level in the corresponding vessel or the line sections 22 drops below the certain height. The valve 30 connected to the warm buffer volume $PV_w$ is then closed. When the heating apparatus is activated, a small quantity of the liquid coolant k is rapidly evaporated. The heating apparatus 34 is controlled by a control unit 35 which can be connected to a liquid level sensor 36 located in the cold buffer volume $PV_k$. The increase in pressure triggered by the heat pulse then pushes the remaining coolant k into the central cavity 12 of rotor 5.

If in a particular embodiment according to FIG. 2, the liquid level need not be measured with a sensor 36 in the region of the cold buffer volume $PV_k$ or of a corresponding region of the line sections 22, in which case the heat pulse can also be applied periodically. The desired brief increase in pressure can then be repeated in regular time intervals.

It is, of course, also possible to combine the embodiment with the means for increasing the pressure, as depicted in FIG. 2, with the embodiment of FIG. 1, which includes a pump 28.

What is claimed is:

1. A machine assembly, comprising
   a rotor supported for rotation about a rotation axis and having at least one superconducting winding which is coupled for heat transfer to a central cavity extending in the direction of the rotation axis;
   a stationary cooling unit located outside the rotor and having a condenser space which is connected to the cavity by a single tube assembly to thereby define a closed single tube system for circulation of a coolant by way of a thermosiphon effect, with a liquid phase of the coolant condensing in the condenser space reaching the cavity through the single tube assembly, and a gaseous phase of the coolant evaporating in the cavity being returned from the cavity to the condenser space via the single tube assembly; and pressure generating means for generating pressure pulses on a part of the gaseous phase of the coolant to produce short-term pumping pulses on the liquid phase of the coolant flowing from the condenser space in a direction toward the cavity.

2. The machine assembly of claim 1, wherein the pressure generating means is constructed to apply pressure pulses to the gaseous phase of the coolant in the condenser space or in the single tube assembly.

3. The machine assembly of claim 1, wherein the pressure generating means comprises a buffer volume, which is filled with the gaseous phase of the coolant under overpressure, or a pump connected to the condenser space or to the single tube assembly.

4. The machine assembly of claim 1, wherein the pressure generating means comprises a heating apparatus applying heat on the liquid phase of the coolant and attached on the single tube assembly, said heating apparatus being activated for applying the pressure pulses.

5. The machine assembly of claim 4, wherein the pressure generating means includes a buffer volume which is filled, at least partially, with the liquid phase of the coolant, said heating apparatus arranged in the buffer volume.

6. The machine assembly of claim 1, wherein the pressure generating means is constructed to continuously apply the pressure pulses.

7. The machine assembly of claim 1, further comprising a sensor operatively connected to the pressure generating means to trigger the application of the pressure pulses.

8. The machine assembly of claim 7, wherein the sensor includes a position sensor which detects a tilt of the rotation axis with respect to a horizontal.

9. The machine assembly of claim 7, further comprising a fill level sensor disposed on the single tube assembly and operatively connected to the pressure generating means for triggering the application of the pressure pulses.

* * * * *